March 30, 1954 M. RETTINGER 2,673,897

AZIMUTH TEST FILM SYSTEM AND METHOD

Filed Jan. 29, 1952 3 Sheets-Sheet 1

INVENTOR.
Michael Rettinger
BY Orl R. Goshaw
ATTORNEY.

INVENTOR.
Michael Rettinger
BY Orl R. Goshaw
ATTORNEY.

March 30, 1954 M. RETTINGER 2,673,897

AZIMUTH TEST FILM SYSTEM AND METHOD

Filed Jan. 29, 1952 3 Sheets-Sheet 3

INVENTOR.
Michael Rettinger
BY
Orl R. Godman
ATTORNEY.

Patented Mar. 30, 1954

2,673,897

UNITED STATES PATENT OFFICE 2,673,897

AZIMUTH TEST FILM SYSTEM AND METHOD

Michael Rettinger, Encino, Calif., assignor to Radio Corporation of America, a corporation of Delaware Application January 29, 1952, Serial No. 268,878

8 Claims. (Cl. 179—100.2)

This invention relates to sound recording and reproducing methods and systems, and particularly to a testing method and system for recording and reproducing magnetic sound records with magnetic recording heads having gaps between the ends of their core sections.

In making longitudinal magnetic recordings on tape or film by ring-shaped magnetic recording heads and in reproducing these magnetic records with a reproduce head, it is important that the gaps of both heads make exactly the same angle with the direction of motion of the record medium. If the angles are different, high frequency losses occur similarly to the losses occurring in the reproduction of photographic sound records when the light slit is tilted. The effect is known as "gap-tilt"or "gap misalignment angle effect." When the same magnetic head is used for both recording and reproducing, the gap angle is of necessity the same, and, therefore, these losses are not present. However, in most instances, the recording is done with one head and reproduced with another head, either in the same machine or in different machines.

In practice, the angle which the recording and reproducing head gap should make with the edge of the film or tape is ninety degrees. If the gaps are always at this angle, then regardless of what head is used for reproduction, no high frequency losses will occur. If the gap tilt or gap misalignment angle is greater than a certain minimum angle, these high frequency losses are too large for commercial purposes. Thus, to minimize the gap tilt angle and to permit its being adjusted to the ninety degree position mentioned above, or sufficiently close thereto for commercial purposes, an azimuth test film or tape is provided. An azimuth test film may be a single magnetically recorded section of a constant frequency, such as 8000 cycles, at a constant amplitude with the gap of the recording head perpendicular to the direction of film travel. As these prior test films were made, it was difficult to test them after they were made to determine whether or not they were true ninety-degree azimuth recordings. A particularly accurate azimuth film of this type may now be made quickly with this invention, as well as a special multi-section azimuth test film.

Test films are well-known, a film for testing the contact between negative and positive films in a photographic printing operation being disclosed and claimed in U. S. Patent No. 2,255,644 of September 9, 1941. Another type of test film for determining picture "jump" is disclosed and claimed in Kellogg co-pending U. S. application, Ser. No. 103,245, filed July 6, 1949. With respect to magnetic sound recording, Blaney U. S. Patent No. 2,528,682 of November 7, 1950, discloses and claims a test system using a special magnetic record for determining uniformity of contact of the gap of a head with the magnetic medium. The present invention is directed to a method of and system for recording azimuth test films and a method of and system for determining the position of a recording head gap with respect to the direction of film travel.

The principal object of the invention, therefore, is to facilitate the testing and adjusting of the gap of a recording and/or reproducing head.

Another object of the invention is to provide an improved method of and system for testing and determining the position of the gap of a recording head with respect to the direction of travel of the record medium at the time of recording.

A further object of the invention is to provide an improved method of and system for making an azimuth test film or tape.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 3:
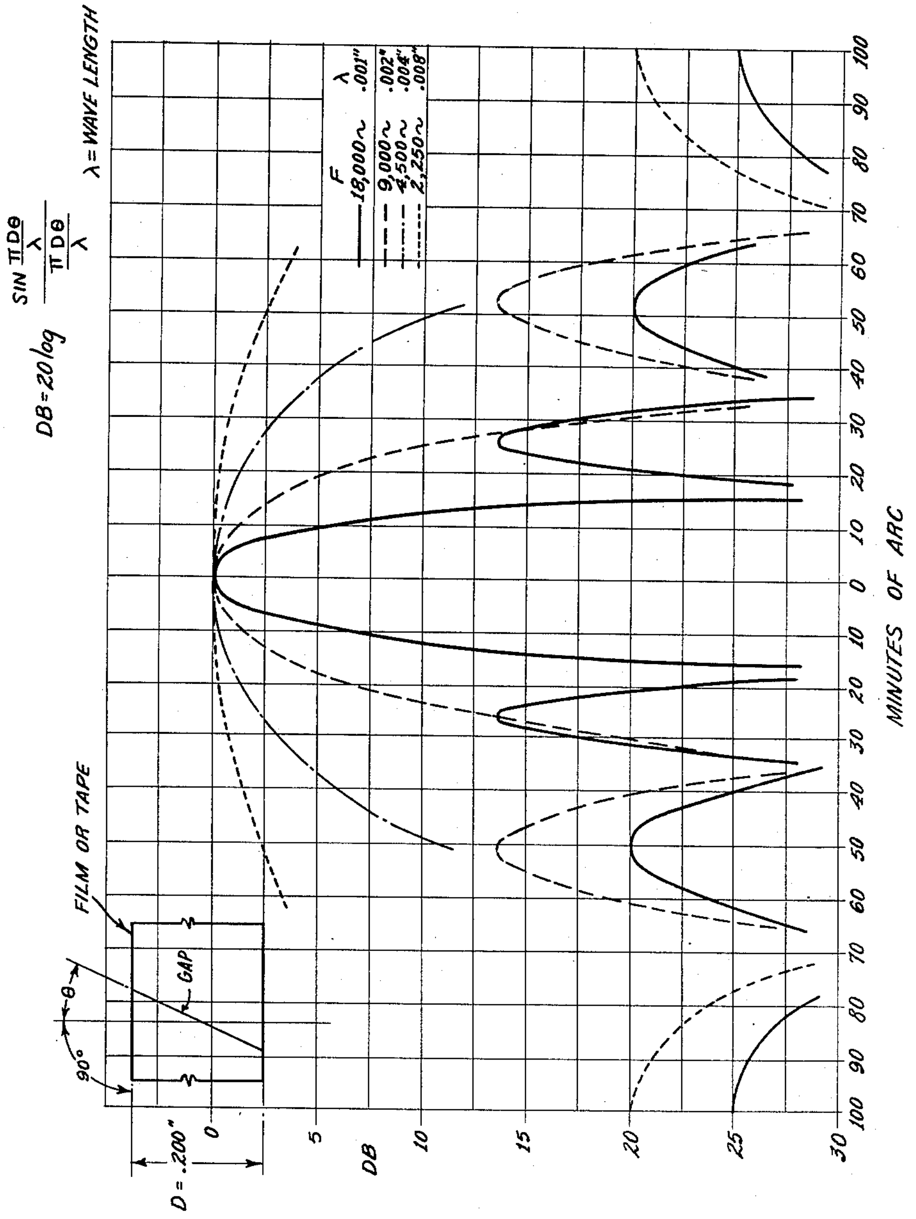
Fig. 3 is a graph showing the decibel reduction in reproducing head output voltage as a function of the gap misalignment angle for variously recorded wavelengths.
Figure 4:
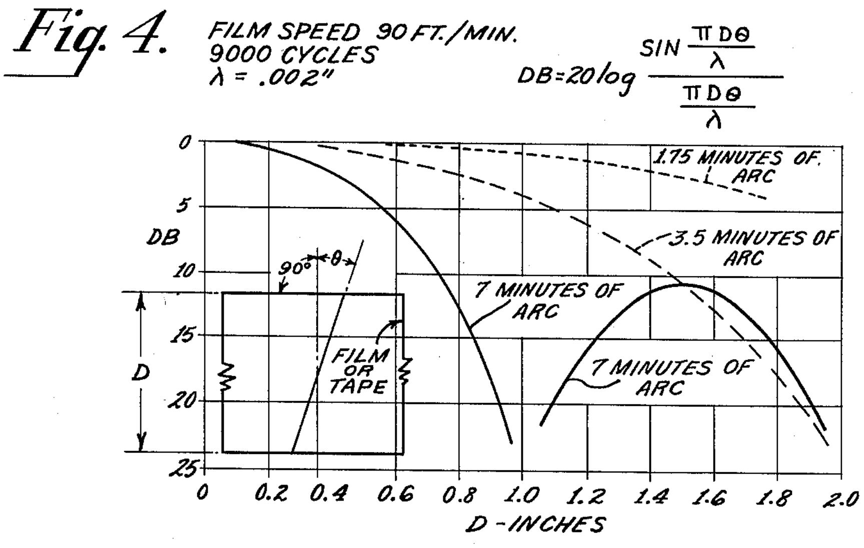
Fig. 4 is a graph showing the decibel reduction in reproduce head output voltage as a function of gap length for various gap misalignment angles.

Referring now to the drawings, and particularly to Fig. 3, it will be observed that several secondary maxima and minima occur on each side of the ninety degree angular position of the gap indicated at zero. As the gap angles increase in either direction, the losses vary in accordance with the frequency of the recorded signal, the curves for four different frequencies being illustrated. As indicated by the equations in Figs. 3 and 4, and as shown in Fig. 4, the losses for a given gap misalignment angle increase also with the width of the head or the length of the gap. Fig. 4 illustrates a gap length variation from 0 to 2.0 inches at 1.75, 3.5, and 7 minutes of arc variation. Thus, as used in the invention, a greater degree of accuracy is obtainable with longer gap heads.

Figures 1, 2:
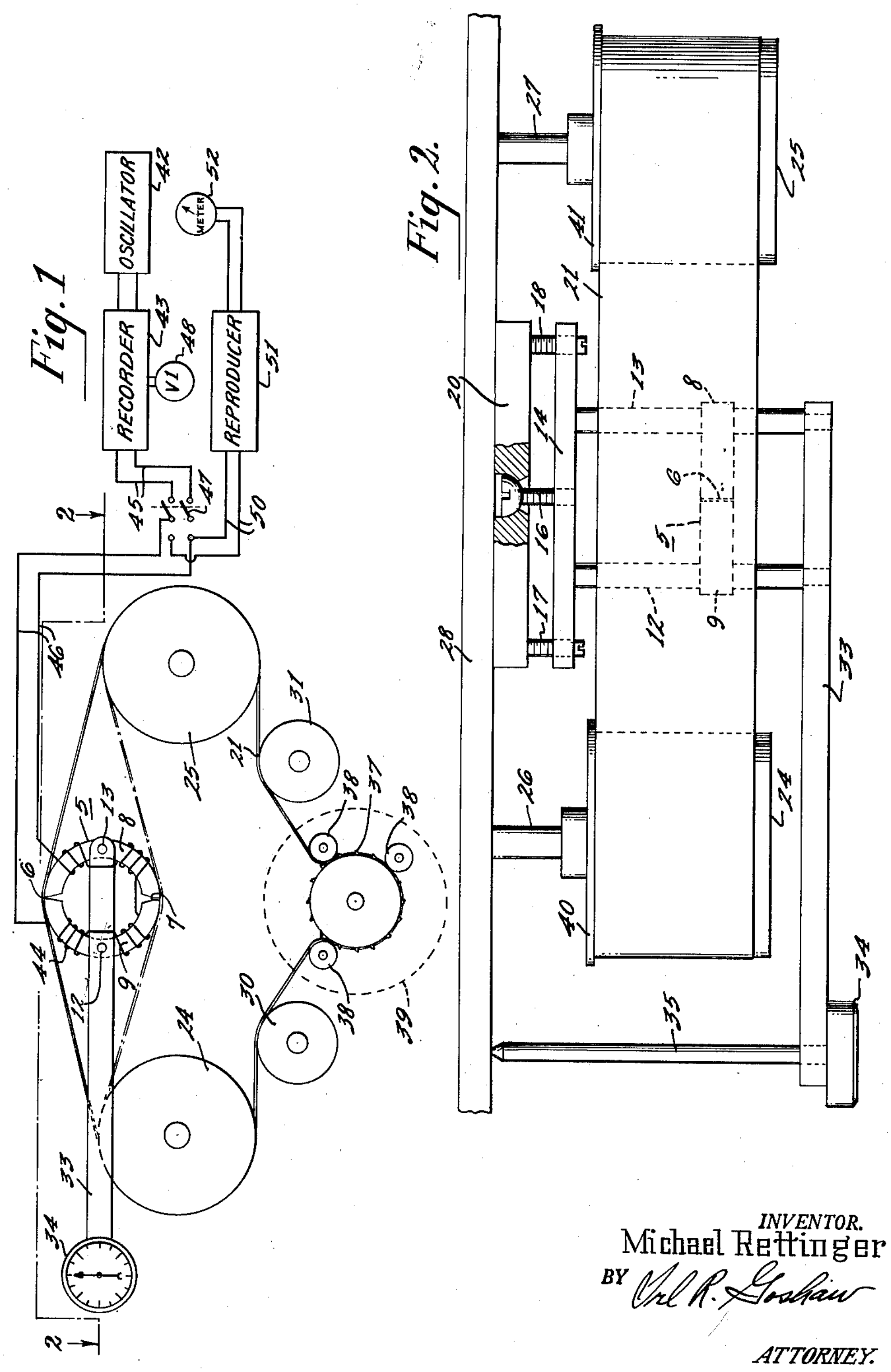
Fig. 1 is an elevational view of a system embodying the invention.
Fig. 2 is a plan view of the mechanism shown in Fig. 1 and taken along the line 2—2 of Fig. 1.

Referring now to Figs. 1 and 2, a system is shown using a special head 5 having two recording or reproducing gaps 6 and 7 between ring core sections 8 and 9. The head 5 is mounted on two rods 12 and 13 attached to a cross member 14. The member 14 has a spherical headed screw 16 attached at the center thereof and two set screws 17 and 18 threaded through the ends of the member 14 and abutting a base member 20 in which the head of screw 16 is positioned. The member 20 is attached to a panel 28. Thus, by advancing and retarding set screws 17 and 18 in the proper directions, the gaps 6 and 7 will be rotated with respect to the direction of travel of a magnetic record medium, such as a film or tape 21. The tape 21 is advanced by a sprocket 37 held thereon by pad rollers 38 and driven by a motor indicated at 39. The medium passes over drums 24 and 25 mounted on shafts 26 and 27, respectively, which, in turn, are mounted on the panel 28. The drums are slightly tapered toward their flanges 40 and 41 so that the film maintains its one edge tightly against the flanges. Guide rollers for the magnetic film or tape 21 are shown at 30 and 31.

The head 5 is much like an ordinary recording and reproducing head, except that the laminations of the cores of sections 8 and 9 are made symmetrical so that when the film passes over either gap, it may be used for either recording or reproducing. To insure that the pole pieces of the laminated cores are in the same plane, the cores are lapped on a diamond lap. The magnetic film, as shown in Fig. 1, may be passed over either gap between the film-pulled rollers 24 and 25. Although the head is shown much narrower than the film 21, it may be wide enough to cover the recording area of film or tape of any width. Multiple track magnetic recording heads may then be easily checked. Also, long gap heads increase the efficiency of the system, as illustrated in Fig. 4.

Mounted across the ends of the rods 12 and 13, is a bar 33, on the end of which is a standard dial indicator 34 having a spring biased actuating rod 35 abutting the panel 28. In this manner, any adjustment of the gaps by the screws 17 and 18 may be registered on the dial indicator 34, so that an accurate indication of the direction and amount of gap tilt may be obtained and measured, if desired.

To accurately position the gaps 6 and 7 perpendicularly to the direction of film travel to record an azimuth test record, the film 21 is first passed over one of the gaps, such as gap 6, and a single frequency, such as 8000 or 9000 cycles, or having a wavelength of the order of .002 inch, is recorded on the film at a certain constant level. The signal may be obtained from an oscillator 42 connected to a recorder amplifier 43, which is connected to winding 44 of the head 5 over conductors 45 and 46 when a switch 47 is closed to the right. The level of the signal is held constant and observed on a meter 48. The film is then turned over or reversed and reproduced on the other gap, such as bottom gap 7. Reproduction is accomplished when switch 47 is closed to the left connecting head 5 over conductors 46 and 50 to reproducing amplifier 51, which, in turn, is connected to meter 52 where the reproduced output level may be observed.

Figure 5:
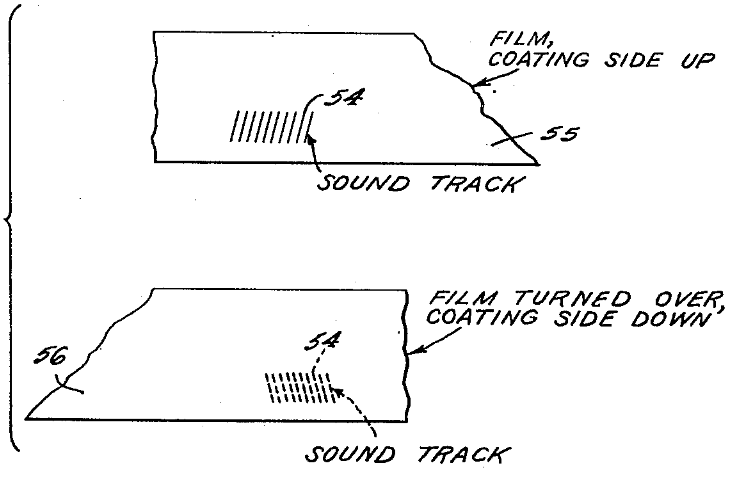
Fig. 5 shows diagrammatic views of a sound track illustrating the operation of the invention.

By reversing the film on the gaps, any angle which the sound track makes with the edges of the film or direction of film travel is reversed. Therefore, any angular departure of the gap from a perpendicular position with respect to the edge of the medium will be doubled during reproduction. This is illustrated in Fig. 5, wherein the invisible magnetic track 54 is shown visible to indicate the tilt angle. The section 55 is the same as section 56, but the section 56 has been reversed and shows the position of the track during reproduction. It is observable, therefore, that when the recording and reproducing gaps 6 and 7 have the position of the track as shown in section 55, the track on section 56 is at twice the angle to the gap position than the gap angle is to a perpendicular position of the edge of the medium. This permits a greater accuracy to be obtained because of the larger readings obtainable, and provides a method of and system for quickly and accurately testing an azimuth test film made by other systems.

Now, as the track 54 is being reproduced, the head 5 is slightly tilted first one way and then the other to observe whether the output of the reproducing amplifier decreases or increases. For instance, should the reproduced level increase when the head is tilted in one direction, it means that the gaps were not perpendicular to the direction of the motion of the film at the time of recording, since both gaps lie in the same plane.

The direction in which the head should be moved to make the gaps perpendicular to the edge of the film is indicated by the direction which increases or decreases the reproduced output. For instance, the head should be turned in the direction which increases the output and the amount of tilt can be read on the dial indicator 34. Another recording may now be made and reproduced similarly. When the reproduced output decreases when the head is tilted in both directions from the recording position, then the gaps are perpendicular to the direction of motion of the film.

When this position is found, an azimuth test film of a single section or multiple section type may be made. The middle section of a multiple section test film is the same as the single section test film; i. e., it is a recording of a single high frequency at constant amplitude with the gap of head perpendicular to the edge of the track medium. The side sections of the multiple test film are at different angles to the perpendicular positions. For instance, the end sections are recorded with the greatest angle of tilt of the recording gap, and this angle is one which reduces the reproduced output in the neighborhood of one to two decibels relative to the output obtained when the head gap is perpendicular to the edge of the film. Although the end sections have the same angle of tilt, they are in opposite directions. The intermediate sections are recorded at a tilt angle, which provides a reduction in reproduced output in the neighborhood of .5 to 1 decibel, depending upon the first tilt angle. The tilt angles of these sections are recorded in the same directions as their adjusted end sections.

This test film may then be used to test and determine the angle of the gap of any head and to indicate the angular direction of adjustment. For instance, during reproduction of the test film, if the maximum output was obtained from an intermediate section of the film, then the reproducing gap has the angle of tilt that the recording head had when this reproduced section was recorded. Thus, the reproducing head is moved to a position where the maximum output is obtained with the middle section of the test film.

The above described method and system, therefore, may be used not only to make azimuth test films, but may be used to determine the angle of tilt of a recording head which has recorded a signal track. By reproducing this track on the adjustable head shown in Figs. 1 and 2, the amount of misalignment of the recording head can be determined and measured.

I claim:

1. The method of determining the angle of the gaps of a magnetic head having two gaps therein in the same plane with respect to the direction of motion of a magnetic record medium adapted to travel over said gaps, comprising recording a magnetic record consisting of a series of longitudinally disposed magnetizations parallel to one another and extending substantially transversely of said medium, said magnetizations also being parallel to said recording gap and at a certain angle to the direction of motion of said medium with one gap of said head, and reproducing said record with the other gap of said head with the medium in a position reversed from its recording position, said parallel magnetizations being disposed with respect to said other gap at twice the angle said magnetizations have with respect to the direction of motion of said medium.

2. The method of determining the angle of the gaps of a magnetic head having two gaps therein in the same plane with respect to the direction of motion of a magnetic record medium adapted to travel over said gaps, comprising magnetizing said medium in a series of parallel magnetizations substantially transversely of said medium and disposed longitudinally thereof, said parallel magnetizations also being parallel with said magnetizing gap and at a certain angle to the direction of motion of said medium with one of said gaps with a signal of a constant high audio frequency and constant level, and detecting said magnetism with the other of said gaps.

3. The method in accordance with claim 2, in which said magnetizing is made with the medium in a certain position on said first gap and said detecting is made with said medium in the reverse position on said second gap, said parallel magnetizations being disposed with respect to said second gap at twice the angle said magnetizations have with respect to the direction of motion of said medium.

4. The method of recording an azimuth test magnetic record comprising recording a record of a constant frequency constant amplitude signal on a record medium with one gap of a double gap magnetic head, said record consisting of a series of longitudinally disposed magnetizations parallel to one another and disposed substantially transversely of said medium, said magnetizations also being parallel to said recording gap and at a certain angle to the direction of motion of said medium, reproducing said recorded signal with the other gap of said head, said parallel magnetizations being disposed with respect to said other gap at twice the angle said magnetizations have with respect to the direction of motion of said medium, and adjusting said head until said reproduction is maximum when said head is in the same position for both the recording and reproducing operations.

5. A system for determining the angle of one or more gaps in a magnetic recording and reproducing head with respect to the direction of travel of a magnetic record medium, comprising a magnetic head having two diametrically positioned gaps therein in the same plane, a record medium, means for advancing said medium over one of said gaps, means for recording a signal on said medium, means for mounting said head for tilting the gaps therein with respect to the direction of travel of said medium, and means for reproducing said recorded signal with said other gap when said medium is advanced over said other gap in the reverse position of said medium.

6. A system in accordance with claim 5, in which said recorded signal is of a constant high audio frequency and constant level.

7. A system for recording a magnetic azimuth test film record comprising a magnetic recording and reproducing head having diametrically positioned gaps with respective pole faces in the same planes, a magnetic record medium, means for advancing said medium over said gaps at mutually exclusive times, means for impressing a signal on said head when said medium is advanced over one of said gaps, and means for reproducing the recorded signal when said medium is advanced over the other of said gaps and said film is reversed in position, said test film record being produced when the output from said recording is maximum with said head in the same position as during recording.

8. A system in accordance with claim 7, in which said signal has a constant amplitude and a constant frequency.

MICHAEL RETTINGER.

References Cited in the file of this patent

UNITED STATES PATENTS

| Number | Name | Date |
| --- | --- | --- |
| 2,524,063 | Masterson | Oct. 3, 1950 |

FOREIGN PATENTS

| Number | Country | Date |
| --- | --- | --- |
| 725,830 | Germany | Sept. 30, 1942 |

OTHER REFERENCES

"Audio Engineering," January 1949, pages 12, 13, 48 and 39.